United States Patent [19]

Taylor

[11] Patent Number: 5,435,726
[45] Date of Patent: Jul. 25, 1995

[54] STORYTELLING GAME AND TEACHING AID

[76] Inventor: Stephanye S. Taylor, P.O Box 82, Buffalo Gap, Tex. 79508

[21] Appl. No.: 169,390

[22] Filed: Dec. 20, 1993

[51] Int. Cl.6 .............................................. G09B 19/22
[52] U.S. Cl. .................................... 434/128; 273/263
[58] Field of Search ............... 434/128, 156, 185, 276, 434/236; 273/236

[56] References Cited

U.S. PATENT DOCUMENTS

| | | | |
|---|---|---|---|
| 3,940,863 | 3/1976 | Kritzbery | 35/22 |
| 3,942,800 | 3/1976 | Holbrook | 273/135 |
| 4,684,135 | 8/1987 | Bouchal | 273/236 |

Primary Examiner—John G. Weiss

[57] ABSTRACT

An amusement game and teaching aid is provided stimulating innovation, creativity, imagination, vocal expression, memory, native American Indian culture, history and exercising fundamental thinking and communications skills and development of motor skills. A storyteller is provided with a plurality of story stones, with each story stone being imprinted with a native American Indian hieroglyphic symbol and legend characterizing a different subject of the story being told, whether it be a true story of history or a randomly made up story by the storyteller. On successfully completing the telling of the story, the storyteller ties one knot in the jute rope.

3 Claims, 6 Drawing Sheets

STORYTELLING GAME AND TEACHING AID

BACKGROUND OF THE INVENTION

The present invention relates, in general, to an apparatus and techniques for stimulating innovation, imagination, creativity, memory, expression and physical development of motor skills. More particularly, the invention is a game having a plurality of stone pieces, each marked with a different hieroglyphic symbol with some or all being incorporated into the storytelling or teaching. Even more particularly, the invention involves a particularly constructed storytelling game, a jute rope for keeping count of the stories told by tying a knot in the jute rope at the completion of each story, an Indian woolen blanket, a stone necklace, a novel and unique receptacle for housing the game components, and the manner and technique of play.

PRIOR ART

The use of word and image stimuli in fostering verbalization and in the development and telling of stories is well known. For example, U.S. Pat. No. 1,379,871, which issued May 31, 1921 to William D. McGuire, Jr., discloses a set of cards each having depicted thereon a scene, an object or descriptive matter used as a device not only for entertainment but also to develop the faculties of imagination and judgment. The cards have as an object the provision of a game or puzzle, the solution of which requires the development of a plot, theme or story. Accompanying the set of cards is a printed sheet suggesting the theme of the story or plot presented in the picture play depicted on the cards. In play, the players know in advance the title for the particular set of cards selected and will have a synopsis giving the theme of the story or picture play. All the cards in the set are dealt out to the several players. The person having the first card, which might be designated as such, makes the first play by placing the card face up on the playing table. The next player has to either produce the next card in the sequence of the story or else answer "I pass", as is usual in playing card games. As disclosed in the patent, a key can be provided with the card set giving the proper sequence of the cards in order to portray the story or play.

In U.S. Pat. No. 3,891,209, a game is disclosed which is used in psychological testing and therapy. This game comprises two different sets of cards. On each card in each set there is provided a plurality of words. The words on the cards in one set all tend to evoke the same primary emotions. And the words on each card in the other set of cards tend to evoke different primary emotions. The words on the cards are used as a jumping off point for story telling, after a particular set of cards is randomly selected by a player. The player receives an award of two gold stars if he successfully tells a story. The number of gold stars that a player receives may determine the winner in any playing session, or, as disclosed in the patent, the gold stars can be turned in for other awards.

A number of different word games are disclosed in A GAMUT OF GAMES, Pantheon Books, New York, N.Y. One such a game, i.e., "Lexicon", uses fifty-two letter cards, the object being, to be the first to play out a hand into a crossword layout. Another type word game, "Boggle", involves sixteen letter cubes shaken into a square. Players list words they find by going from letter to letter in any direction. A third type of word game, "Scrabble", involves letter tiles played on a board in crossword fashion. Still, a fourth type word game involves a game wherein whole words are used in the play. For example, in the game "Facts In Five", five categories are chosen from cards and five letter tiles are turned up. Each player, in five minutes, tries to write a word for each category, starting with each letter.

Other "games" disclosed in A GAMUT OF GAMES like that disclosed in U.S. Pat. No. 3,891,209 are in some way tied in with personality and analysis. These are not really games as such. They involve no competition even though played with others. For example, "Reunion" gives a person the opportunity to relate to a number of pictures, to imagine a happening, to use his intuition, or to recall a childhood memory.

Cards bearing pictorial illustrations are used by teachers to develop association and generalization skills. For example, there is shown in TEACHING RESOURCES, 1979 Catalog, at page 35, a flip chart book containing two rows of superposed pictures of common objects. The pictures in one row can be paired with any picture in the other row and compared by, e.g., a student, for likenesses and differences.

None of the games heretofore invented, or, any of the word and image stimuli of which I am aware, however, involved the actual telling of a story based on native American (Indian) history, hieroglyphics and images. Games involving a story such as disclosed in U.S. Pat. No. 1,379,871 do not require the participant to tell a story based upon the graphic images in the cards involved. Instead, the participants are required to play the cards involved in a certain pictorial sequence, that sequence itself telling the story and requiring no verbalization thereof by a participant.

In U. S. Pat. No. 3,891,209, storytelling is involved; however, graphic images do not form the basis for the storytelling. The basis for a story told involves words on a card.

OBJECTS AND SUMMARY OF THE INVENTION

There is provided in accordance with the basic aspects of the present invention an apparatus or means which has as its primary object the stimulation of innovation and the exercising of fundamental thinking, communication and motor skills. Quite advantageously, the invention is in the form of a game which provides not only inspiration but education and entertainment as well. The game, moreover, allows for the inclusion of native American (Indian) material that specifically references those concepts that the participants wish to consider.

The storytelling game and teaching aid of the present invention in its most basic aspects comprises a plurality of stones of predetermined size and shape, a plurality of hieroglyphic illustrations being affixed to and on each of said stones, each said hieroglyphic illustration being provided with a legend specifying a characteristic of the story being told.

Therefore it is an object of the present invention to heighten the awareness and history of native American Indians.

Another object of the present invention is to provide a stone necklace to be worn by and to identify the storyteller.

Still another object of the present invention is to provide a woolen Indian blanket for the purpose of relating and identifying.

Yet another object of the present invention is to provide a jute rope which is used by tying a single knot in the rope at the conclusion of each story.

A still further object of the present invention is to provide a list of native American Indian names.

It is also an object of the present invention to provide a list of native American Indian hieroglyphic illustrations and the identity of each one.

Another object of the present invention is the game is stored, while not in use, in a receptacle of novel and unique construction comprising, in its basic aspects, a base unit and a cover. Leather hinges are provided for opening and closing the cover. A buffalo head is branded into the cover and a plurality of early western brands decorate the front, back and ends of the base unit.

As a further advantage, it is also an object of the present invention to provide a storytelling game and teaching aid which is relatively simple and inexpensive in construction, yet reliable and easy to manufacture.

These and other embodiments, objects, features and advantages of this invention will be apparent in the following detailed description of illustrative embodiments thereof, which is to be read in connection with the accompanying drawings.

DETAILED DESCRIPTION OF THE INVENTION AND THE PREFERRED EMBODIMENTS

Figure 1:
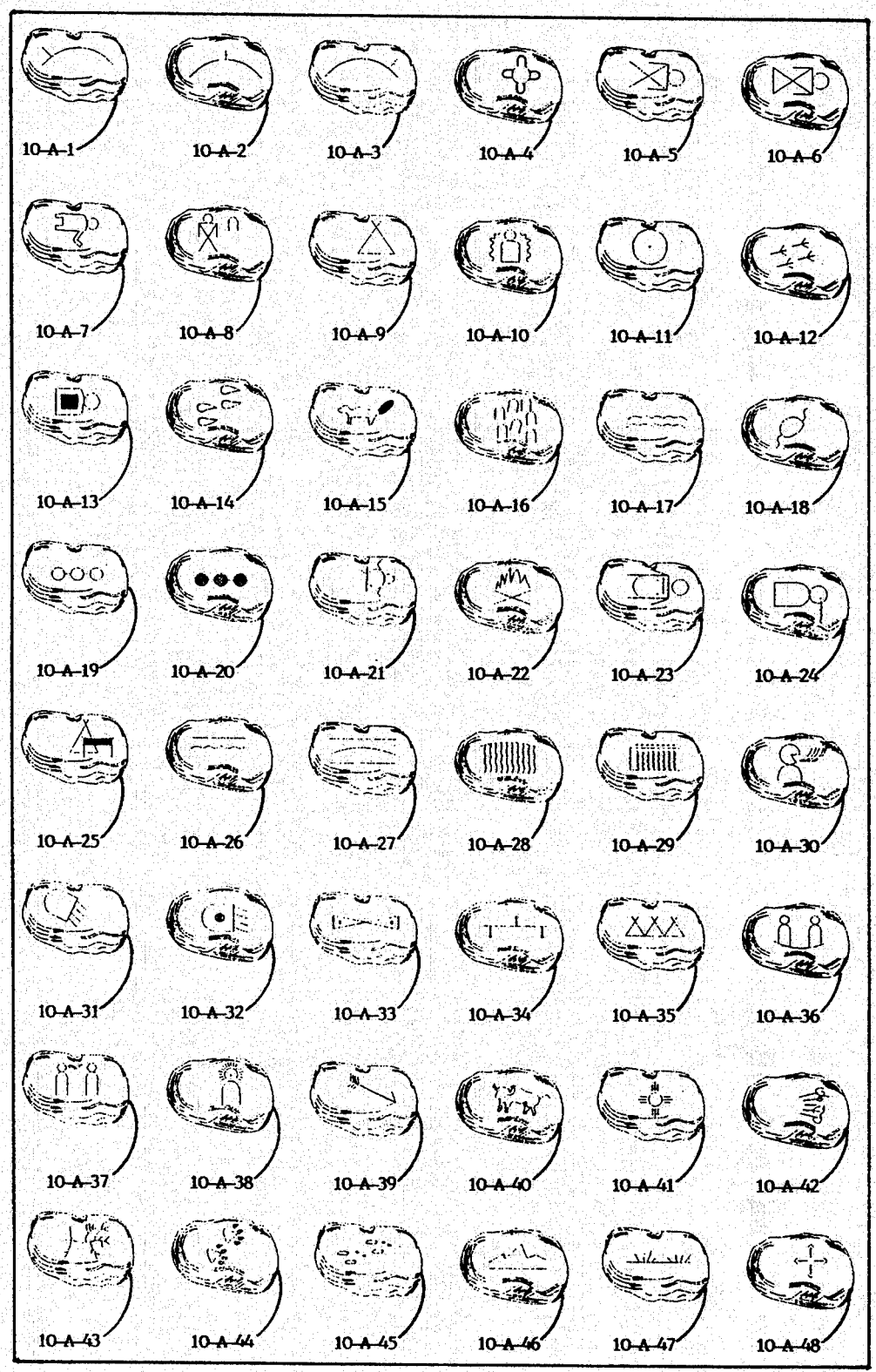
FIG. 1 is a plain view of the stones with the native American Indian hieroglyphic symbols on them.

Turning now to the drawings, there is shown in FIG. 1 a plurality of story stones with native American Indian hieroglyphic symbols on each 10-A-1 thru 10-A-48. To those familiar in the art, it will be readily understood that these stones 10-A-1 thru 10-A-48 could be molded and mass produced from a variety of materials, such as cement, plastics, etc., etc.. It would also be obvious that the hieroglyphic symbols could be machine stamped or imprinted mechanically. But for the purpose of description, the method of manufacturing these story stones of the present invention is as follows: Natural native stones or gathered, they are sized (about the size of a U.S. half dollar), these stones are then washed and cleansed in a biodegradable solution, the stones are then placed on racks and allowed to dry naturally in the sun and wind. After the drying process (approximately 48 hours) the clean stones are once again gathered and each stone is then hand painted with one of the native American Indian hieroglyphic symbols.

Figure 2:
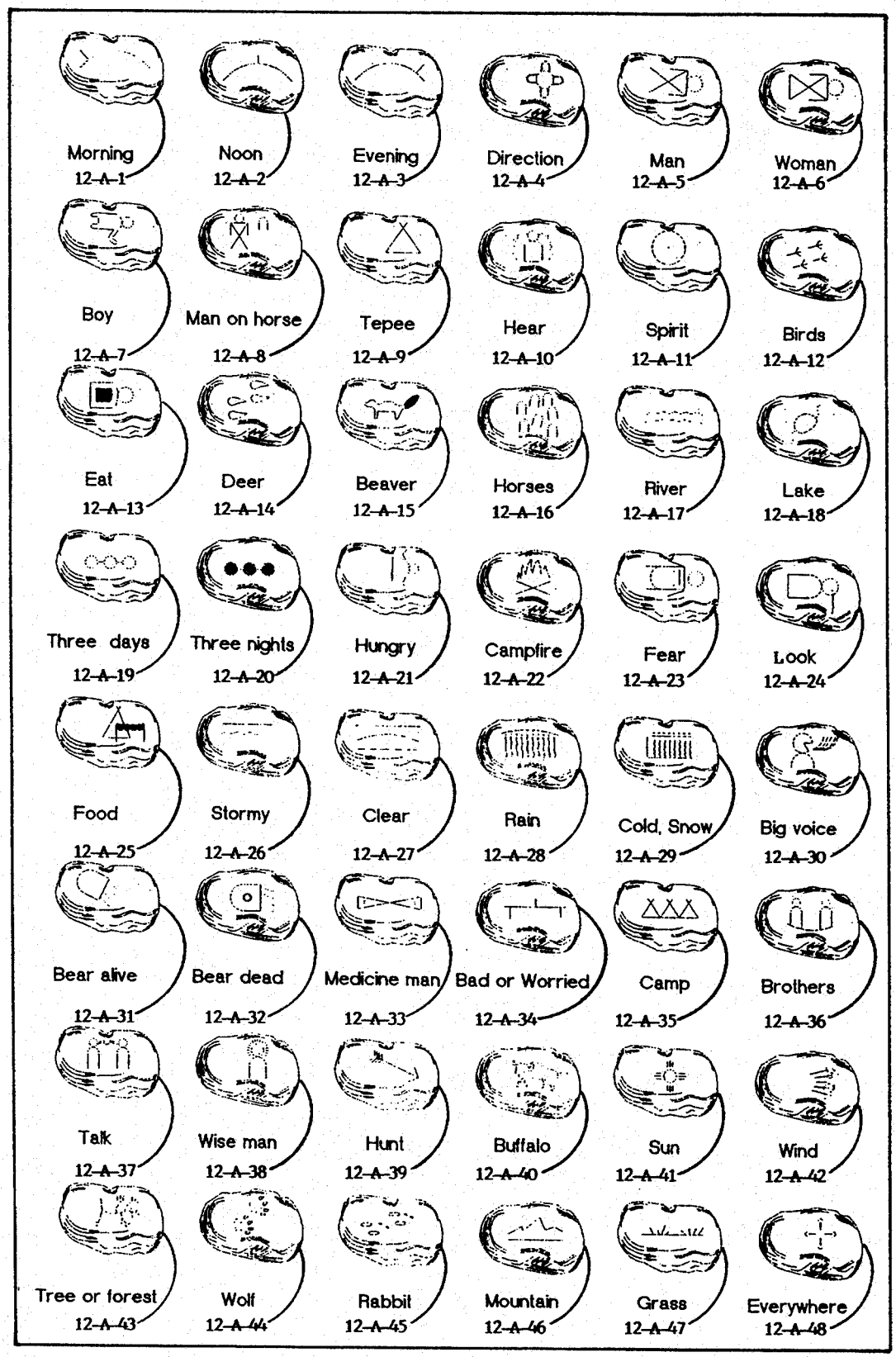
FIG. 2 is a plain view of the stones with the native American Indian hieroglyphic symbols and the definition of each symbol.

FIG. 2 is a plurality of story stones 12-A-1 thru 12-A-48 with the native American Indian hieroglyphic symbols and the meaning of each; 12-A-1 is the symbol meaning "MORNING", 12-A-2 is the symbol meaning "NOON", 12-A-3 is the symbol meaning "EVENING", 12-A-4 is the symbol meaning "DIRECTION", 12-A-5 is the symbol meaning "MAN", 12-A-6 is the symbol meaning "WOMAN", 12-A-7 is the symbol meaning "BOY", 12-A-8 is the symbol meaning "MAN ON HORSE" 12-A-9 is the symbol meaning "TEPEE", 12-A-10 is the symbol meaning "HEAR", 12-A-11 is the symbol meaning "SPIRIT", 12-A-12 is the symbol meaning "BIRDS", 12-A-13 is the symbol meaning "EAT", 12-A-14 is the symbol meaning "DEER", 12-A-15 is the symbol meaning "BEAVER", 12-A-16 is the symbol meaning "HORSES", 12-A-17 is the symbol meaning "RIVER", 12-A-18 is the symbol meaning "LAKE", 12-A-19 is the symbol meaning "THREE DAYS", 12-A-20 is the symbol meaning "THREE NIGHTS", 12-A-21 is the symbol meaning "HUNGRY", 12-A-22 is the symbol meaning "CAMPFIRE", 12-A-23 is the symbol meaning "FEAR", 12-A-24 is the symbol meaning "LOOK", 12-A-25 is the symbol meaning "FOOD", 12-A-26 is the symbol meaning "STORMY", 12-A-27 is the symbol meaning "CLEAR", 12-A-28 is the symbol meaning "RAIN", 12-A-29 is the symbol meaning "COLD, SNOW", 12-A-30 is the symbol meaning "BIG VOICE", 12-A-31 is the symbol meaning "BEAR ALIVE", 12-A-32 is the symbol meaning "BEAR DEAD", 12-A-33 is the symbol meaning "MEDICINE MAN", 12-A-34 is the symbol meaning "BAD OR WORRIED", 12-A-35 is the symbol meaning "CAMP", 12-A-36 is the symbol meaning "BROTHERS", 12-A-37 is the symbol meaning "TALK", 12-A-38 is the symbol meaning "WISE MAN", 12-A-39 is the symbol meaning "HUNT", 12-A-40 is the symbol meaning "BUFFALO", 12-A-41 is the symbol meaning "SUN", 12-A-42 is the symbol meaning "WIND", 12-A-43 is the symbol meaning "TREE OR FOREST", 12-A-44 is the symbol meaning "WOLF", 12-A-45 is the symbol meaning "RABBIT", 12-A-46 is the symbol meaning "MOUNTAIN", 12-A-47 is the symbol meaning "GRASS", and 12-A-48 is the symbol meaning "EVERYWHERE".

Figure 3:
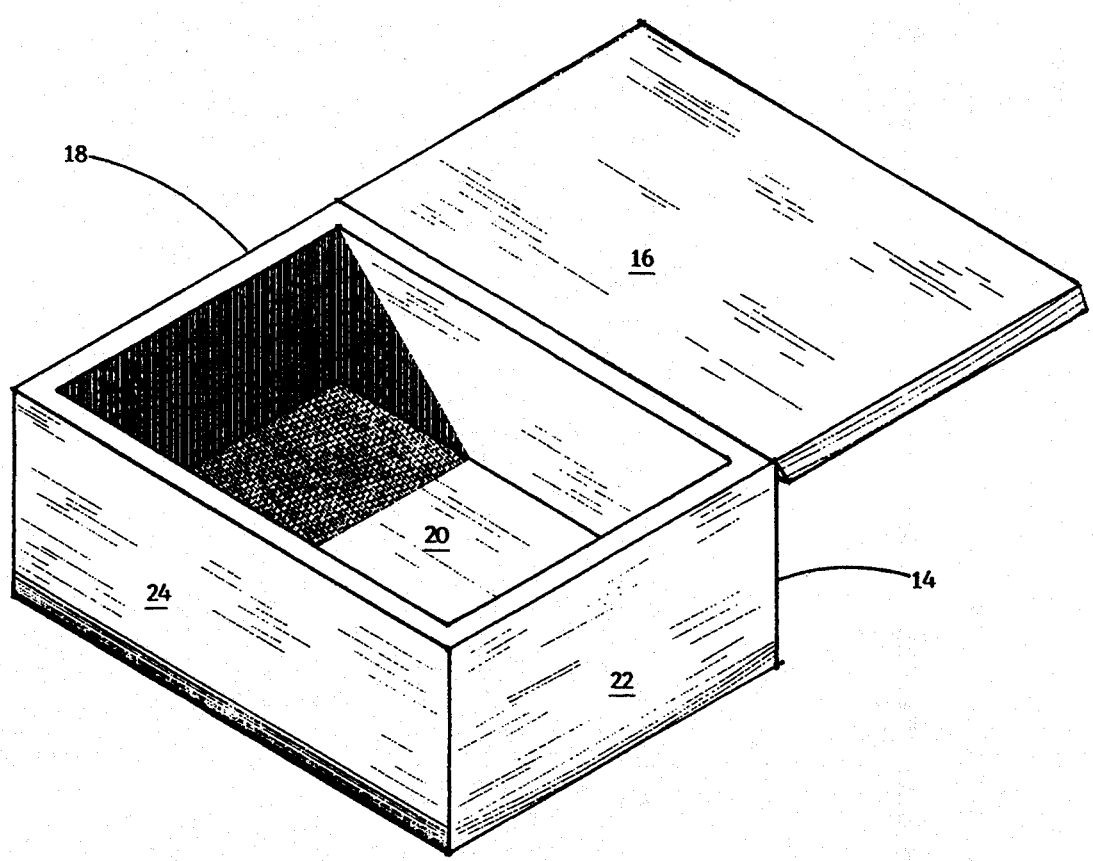
FIG. 3 is a perspective view of the game's storage unit open.

FIG. 3 is an illustration of the storage unit 18 of the storytelling game and teaching aid. The storage 18 has a floor and four vertical walls 14 with a hinged cover 16. Said unit 18 being of an adequate size to house all the pieces of above said game, approximately 10 inches long by 7 inches wide by 5 inches deep. The said storage unit 18 could be manufactured from a variety of materials such as plastic, metal, fiberglass, etc., etc.. For the purpose of explanation and description, the present invention storage unit 18 is constructed from soft wood. The storage unit 18 floor 20 and cover 16 are cut the same size, the end walls 22 are cut and finished the same size, side walls 24 are also cut and finished the same size. When all the storage unit 18 pieces are ready, side walls 24 are nailed, glued or otherwise attached to floor 20, end walls 22 are then attached to floor 20 and ends of side walls 24, cover 16 is attached to outside of wall 24 with a set of leather hinges (not shown), the storage unit 18 is then sanded, and the decorative western brands 26 are done.

Figure 4:
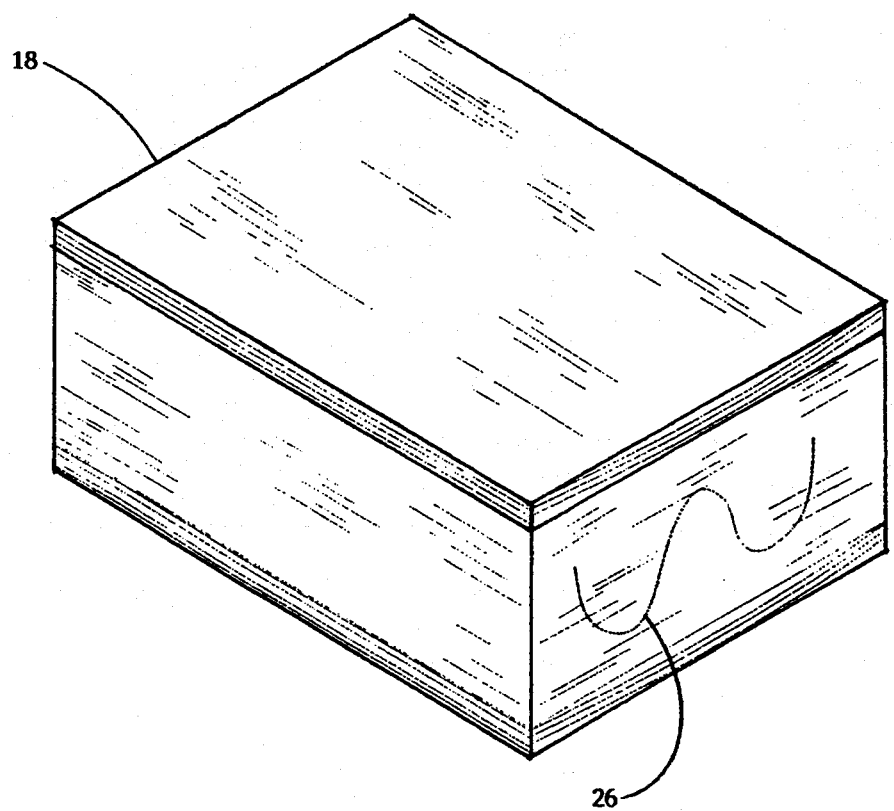
FIG. 4 is a perspective view of the game's storage unit closed.
Figure 5:
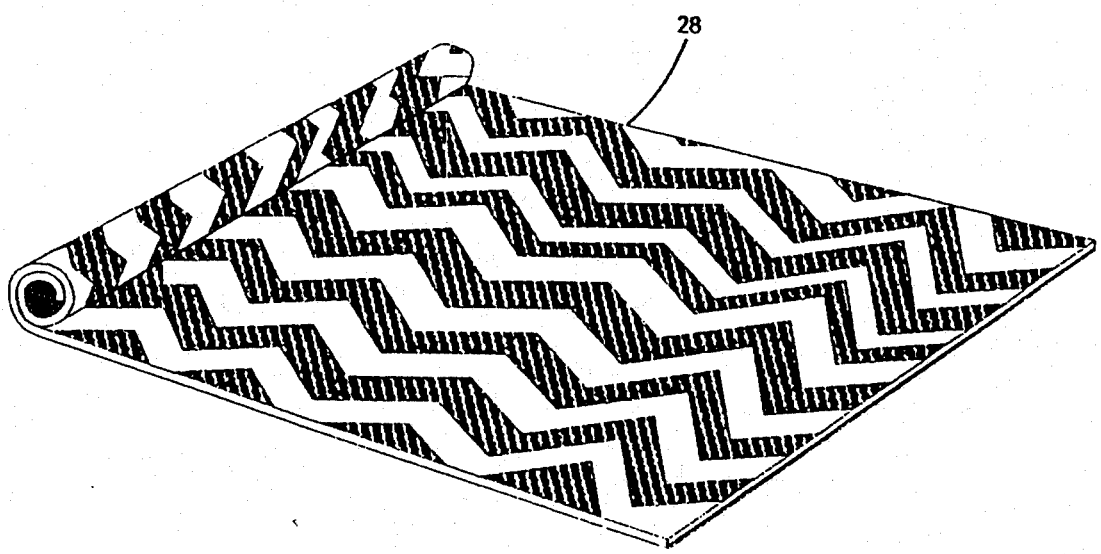
FIG. 5 is a perspective view of an Indian woolen blanket.
Figures 6, 7:
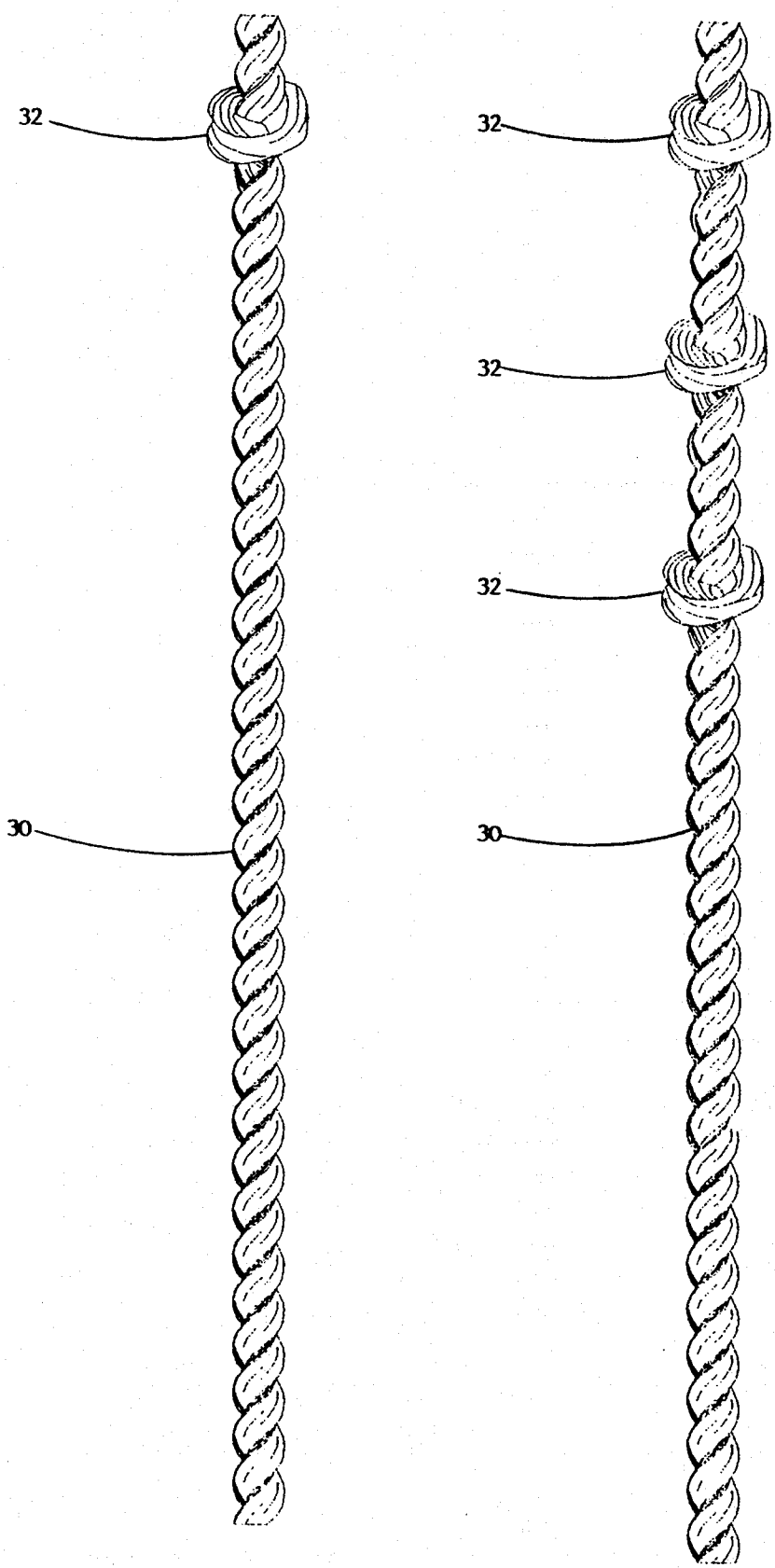
FIG. 6 is a perspective view of a jute rope.
FIG. 7 is a perspective view of a jute rope as it would be knotted in its intended environment.

FIG. 4 is a drawing of a storage unit 18 with a western brand 26, the branding designs 26 are burnt (branded) into the soft wood storage unit 18 by means of a commercial electric branding iron. FIG. 5 is a drawing of a native American Indian woolen blanket 28. FIG. 6 and 7 are drawings of a jute rope 32 with tie knots 32.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

I claim:

1. Game and teaching aid for stimulating innovation, creativity, imagination, vocal expression, memory and exercising fundamental thinking and communications skills and development of motor skills comprising, in combination, a plurality of stone pieces, each of a predetermined size to be used by the storyteller of the game and teaching aid, a plurality of native American Indian hieroglyphic symbols being affixed to and on each said stone piece, each said native American Indian hieroglyphic symbol being provided with a legend specifying a different primary characteristic of a story to be told by a storyteller of the game, a jute rope for recording and indicating that the story teller has completed the story by tying a single knot in said jute rope as each story is finished.

2. Game and teaching aid according to claim 1 further comprising a rectangular-shaped receptacle for orderly storage of the said game and teaching aid components when not used in play or teaching, said receptacle comprising a rectangular-shaped base unit defined by parallel, vertically disposed side and end walls, a horizontally disposed top cover, and a horizontally disposed bottom member parallel to said top cover and spaced apart therefrom by said end walls and side walls, said cover being attached to said receptacle by leather hinge straps.

3. Game and teaching aid according to claim 2 wherein pictorial illustrations are provided on the outer planar wall surface of said storage receptacle.

* * * * *